(No Model.)
M. COVEL.
SAW SWAGING MACHINE.
No. 345,121. Patented July 6, 1886.
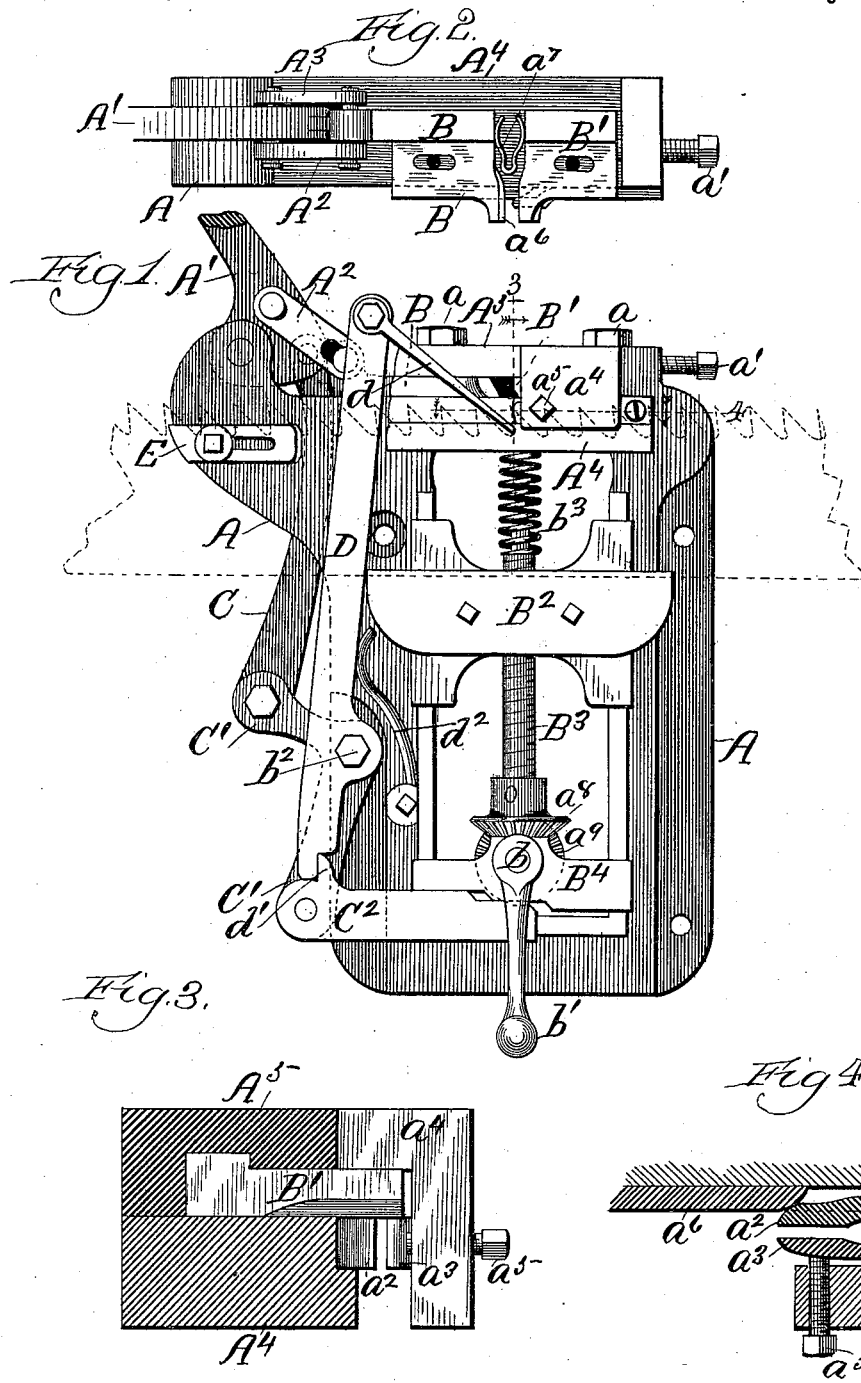
Witnesses.
Chas. E. Gaylord
L. M. Freeman
Inventor,
Milo Covel.
By L. B. Coupland & Co.
Att'ys

UNITED STATES PATENT OFFICE.

MILO COVEL, OF CHICAGO, ILLINOIS.

SAW-SWAGING MACHINE.

SPECIFICATION forming part of Letters Patent No. 345,121, dated July 6, 1886.

Application filed October 20, 1885. Serial No. 181,207. (No model.)

*To all whom it may concern:*

Be it known that I, MILO COVEL, of Chicago, county of Cook, and State of Illinois, have invented certain new and useful Improvements in a Saw-Swage, of which the following is a full, clear, and exact description, that will enable others to make and use the same, reference being had to the accompanying drawings, forming a part of this specification.

This invention relates to improvements in that class of devices that are more especially intended for use on band and gang saws; and it consists of certain novel features in the construction, combination, and arrangement of parts, as will be hereinafter set forth.

Figure 1 is a front elevation; Fig. 2, a top view with the cap $A^5$ removed; Fig. 3, a vertical section in the plane 3, Fig. 1; and Fig. 4 a horizontal section in the plane 4, Fig. 1.

Referring to the drawings, A represents a frame or back plate to which the working parts are attached. This frame is usually bolted to some substantial support and in the position shown in Fig. 1.

A' is the operating-lever, pivoted to a projecting lug on the frame, and is moved or shifted across the device in the swaging process. This lever is shown nearly at its extreme outward or normal position, the adjustable or movable die B being backed away from the stationary die B', as shown in Figs. 1 and 2. The adjustable die B is pivoted between the inner ends of the links $A^2$ $A^3$, the opposite ends of these links being in turn pivoted to the operating-lever, as shown in Fig. 2. The dies B B' rest upon the cross-bar $A^4$ and are retained in place on the upper side by means of the removable cap $A^5$, bolted in place, the dies being provided with elongated apertures, as shown in Fig. 2, so as to admit of proper adjustment without interference from the cap-bolts $a$ $a$. The position of the stationary die is changed by the screw $a'$.

The spring clamping-jaws $a^2$ $a^3$ serve to rigidly clamp the saw as each tooth is being swaged. The jaw $a^2$ is secured to the supporting-frame, and the jaw $a^3$ to the angle guide-plate $a^4$, as shown in Fig. 4. The loose end of the jaw $a^3$ is set in the direction of the saw by means of the adjusting-screw $a^5$. The under side of the movable die B is provided with the wedge-block $a^6$, the end of which projects a little in advance of said die, as shown in Fig. 2, and as the die moves forward the advanced end of the wedge $a^6$ passes in back of the loose end of the jaw $a^3$, as shown in Fig. 4, and forces the same in the direction of the companion jaw, and firmly clamps the saw between the two just before the tooth is swaged, the saw being released as the movable die recedes.

The spring $a^7$ (shown in Fig. 2) serves to assist in spreading the dies when the operating-lever is returned to a normal position.

The slide $B^2$ supports the saw in proper position to be operated upon, and is capable of a vertical adjustment by means of the screw $B^3$, so as to adapt this part of the device to saws of different widths. The lower end of the screw $B^3$ is journaled in the cross-bar $B^4$ and has the beveled pinion $a^8$ mounted thereon, which engages with the companion pinion $a^9$, mounted on the inner end of the horizontal shaft $b$, the hand-crank $b'$ being mounted on the outer end of said shaft. By this means the slide $B^2$ is raised or lowered by hand, as may be required in accordance with the width of the saw.

The arm C connects the operating-lever with the upper end of the angular lever C', pivoted to the frame-work at $b^2$. The lower end of this angular lever is connected to the outer end of the horizontal moving bar $C^2$, which has a sliding bearing on the lower part of the frame. The bar $C^2$ is cut away on the upper side for a little way back from the inner end, thus forming an offset and lessening the width of the bar at that point. The cross-bar $B^4$ is cut away on the under side in a corresponding manner and rests on top of the bar $C^2$.

As shown in Fig. 1, the bar $B^4$ rests on the narrowest part of the bar $C^2$. In this position the saw (indicated by the dotted lines) is ready to be raised up, so as to bring the next tooth into position to be swaged. Now, as the operating-lever is moved to bring the dies together, the bar $C^2$ is forced inward by the connections described, bringing the wider part of the same under the wider part of the bar $B^4$, and thus raising the saw and bringing the tooth into position at the proper time to be operated upon by the swaging-dies.

When the lever is returned to a normal position, the bar $C^2$ is drawn back and the bar $B^4$ gravitates to its lowest position, the weight of the saw and the spiral spring $b^3$ assisting to produce this result.

The feed-arm D is pivoted at $b^2$, and is adapted to have an oscillating or vibratory action on its pivot. The upper end of this arm has the feed-finger $d$ pivoted thereto, the loose end of which is adapted to engage with the teeth of the saw and bring each tooth into position to be operated upon. The lower end of the feed-arm has frictional contact with the lug $d'$ on the bar $C^2$, by which means the lower end of the feed-arm is forced outward and the saw fed forward one tooth at each movement. The spring $d^2$ serves to return the feed-arm to a normal position when the pressure of the bar $C^2$ is relaxed, the feed-finger dropping into the next tooth. The adjustable stop E limits the throw of the feed-arm.

The operation of the device is as follows: The slide $B^2$ should be first adjusted by hand to receive the saw and support the same at the proper height relative to the swaging-dies. The operating-lever is now moved inward from a normal position, and as the movable die approaches the companion die the saw is raised to bring the point of the tooth between the two through the medium of the connecting-arm C, the angular or bell-crank lever $C'$, and the wedging-bar $C^2$. At the same time the wedge-block $a^6$ throws the jaw $a^2$ inward in position to clamp the saw, and the pressure on the lower end of the feed-arm D being relaxed the spring $d^2$ throws the upper end back and drops the feed-finger into the next tooth, so that when the operating-lever is returned the saw is moved ahead one tooth. Thus all the mechanism is actuated by the movement of said lever.

Having thus described my invention, what I claim as new, and desire to secure by Letters Patent, is—

1. In a saw-swage, the combination, with an operating-lever, of a movable die connected with said lever, a wedge-block attached to the under side of and projecting a little in advance of said die, and the clamping jaws $a^2$ $a^3$, whereby one of said jaws is forced in the direction of the companion jaw and the saw clamped between the two, substantially as set forth.

2. In a saw-swage, the combination, with the frame A, of the cross-bar $A^4$, the removable cap $A^5$, and the angular guide-plate $a^4$, substantially as set forth.

3. In a saw-swage, the combination, with the operating-lever $A'$, of the connecting-arm C, the angular lever $C'$, the horizontal moving bar $C^2$, having an offset on the upper side, the cross-bar $B^4$, having a corresponding offset, the screw $B^3$, and the saw-supporting slide $B^2$, whereby the saw is raised and lowered at each movement of the operating-lever, substantially as and for the purpose set forth.

4. In a saw-swage, the combination, with the operating-lever, of the arm C, the angular lever $C'$, the horizontal bar $C^2$, the feed-arm D, and the feed-finger $d$, adapted to engage with the saw-teeth, whereby the saw is moved one tooth at each return movement of the operating-lever, substantially as and for the purpose set forth.

MILO COVEL.

Witnesses:
L. M. FREEMAN,
U. STANWOOD.